United States Patent [19]
Gawve et al.

[11] Patent Number: 5,234,302
[45] Date of Patent: Aug. 10, 1993

[54] CONVEYOR BELT FOR BRAZE FURNACE

[75] Inventors: Warren L. Gawve; John P. Papin; Jayesh B. Patel; Peter A. Lyon, all of Lockport; David W. Beddome, Amherst, all of N.Y.

[73] Assignee: General Motors Corporation, Detroit, Mich.

[21] Appl. No.: 982,918

[22] Filed: Nov. 30, 1992

[51] Int. Cl.[5] .............................................. B65G 25/00
[52] U.S. Cl. ..................................... 414/157; 198/845; 198/853
[58] Field of Search ................ 198/838, 845, 851, 853; 414/157, 196, 171; 432/239

[56] References Cited

U.S. PATENT DOCUMENTS

| | | | |
|---|---|---|---|
| 990,003 | 4/1911 | Piper | 198/845 |
| 1,026,617 | 5/1912 | Turnbull | 198/845 |
| 1,721,939 | 7/1929 | Anderson | 198/851 X |
| 1,746,383 | 2/1930 | Deakin | 198/845 |
| 2,153,098 | 4/1939 | Pellar | 198/838 |
| 3,866,743 | 2/1975 | Jorgenson | 198/845 X |
| 4,338,078 | 7/1982 | Lampkin | 198/849 X |
| 4,440,294 | 4/1984 | Langen | 198/838 |
| 4,582,972 | 4/1986 | Curtin et al. | 198/851 X |

Primary Examiner—Robert P. Olszewski
Assistant Examiner—Cheryl L. Gastineau
Attorney, Agent, or Firm—Patrick M. Griffin

[57] ABSTRACT

A conveyor assembly for a braze furnace includes a plurality of first chain links pivotally interconnected to form a continuous loop chain and a plurality of second chain links pivotally interconnected to form a continuous loop chain identical to the first chain links. The first and second chain links are interconnected by rod-like cross members which also integrally form the pintles for the respective first and second chain links. First and second rollers are rollably supported from each cross member adjacent the respective first and second chain links. First and second workpart support members are pivotally connected between adjacent pairs of cross members and disposed equidistantly between the first and second rollers. The first and second workpart support members may be either cast or stamped structures having a flat upper surface for supporting workparts above the first and second chain links and above the first and second rollers. The entire conveyor assembly is fabricated from stainless steel or similar corrosion resistant material.

6 Claims, 7 Drawing Sheets

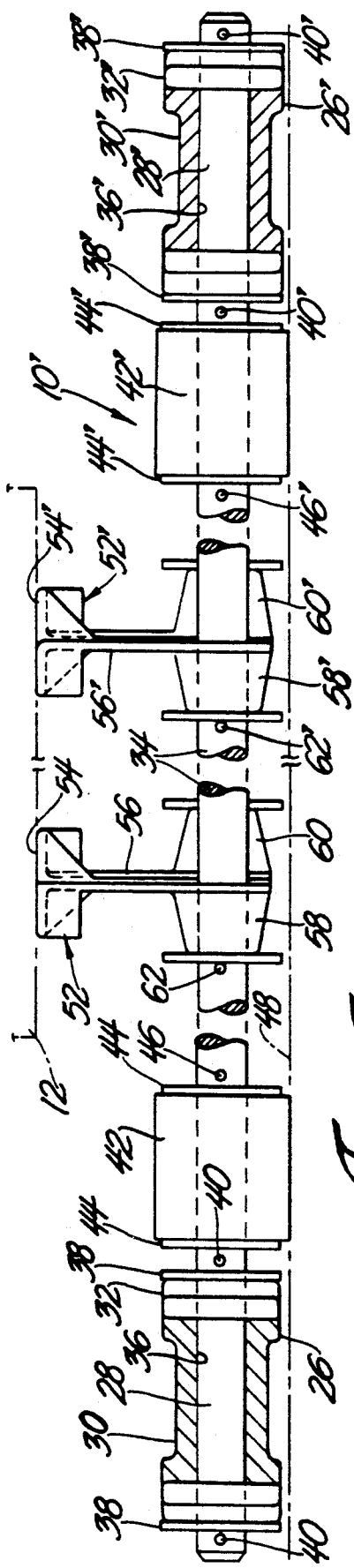
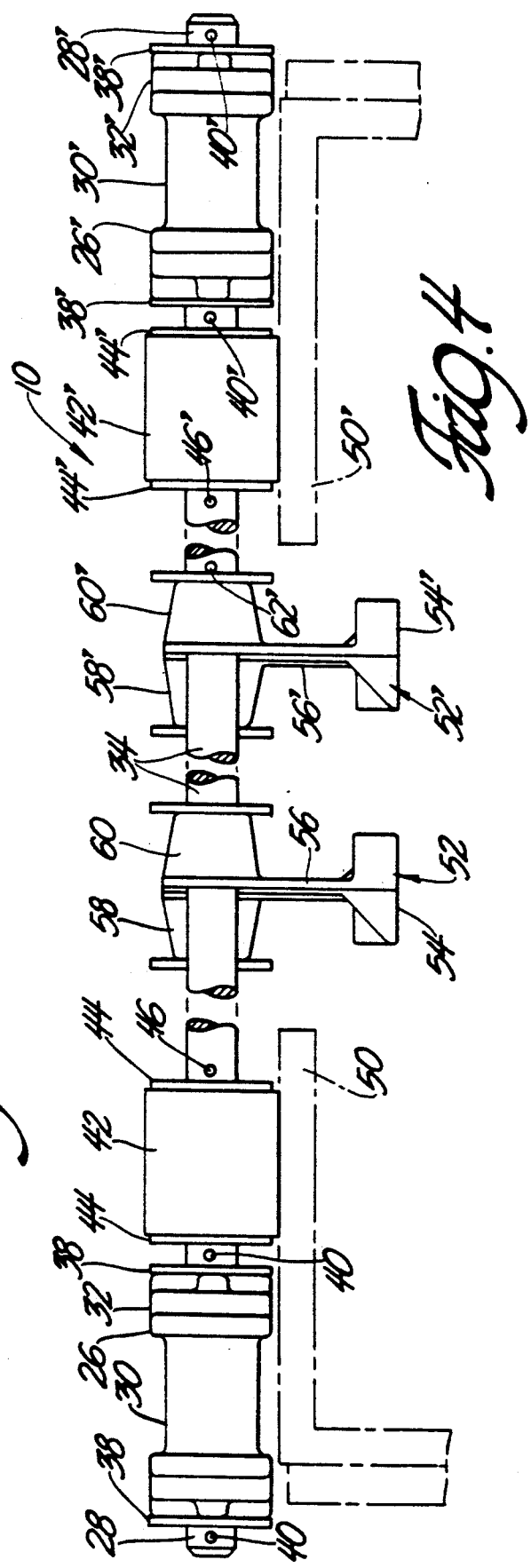

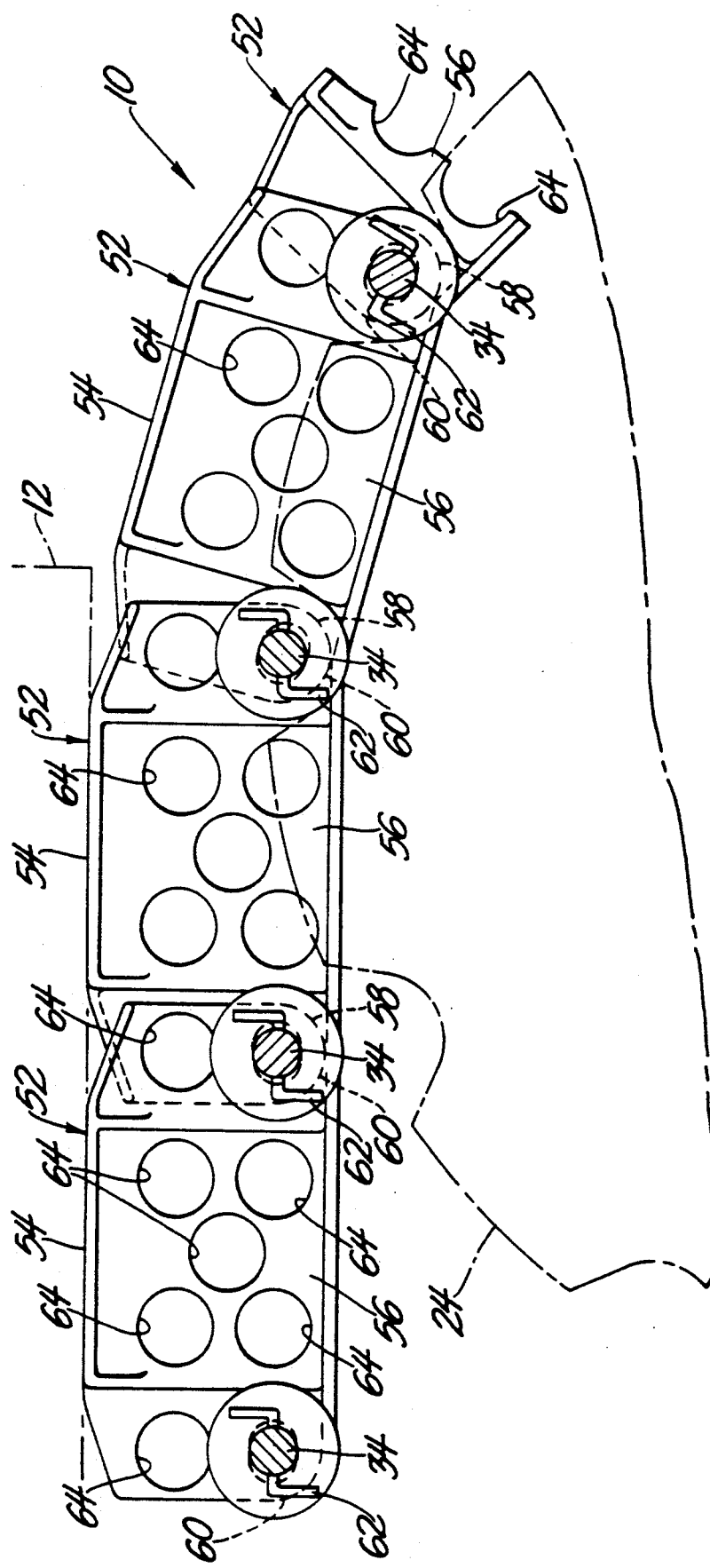

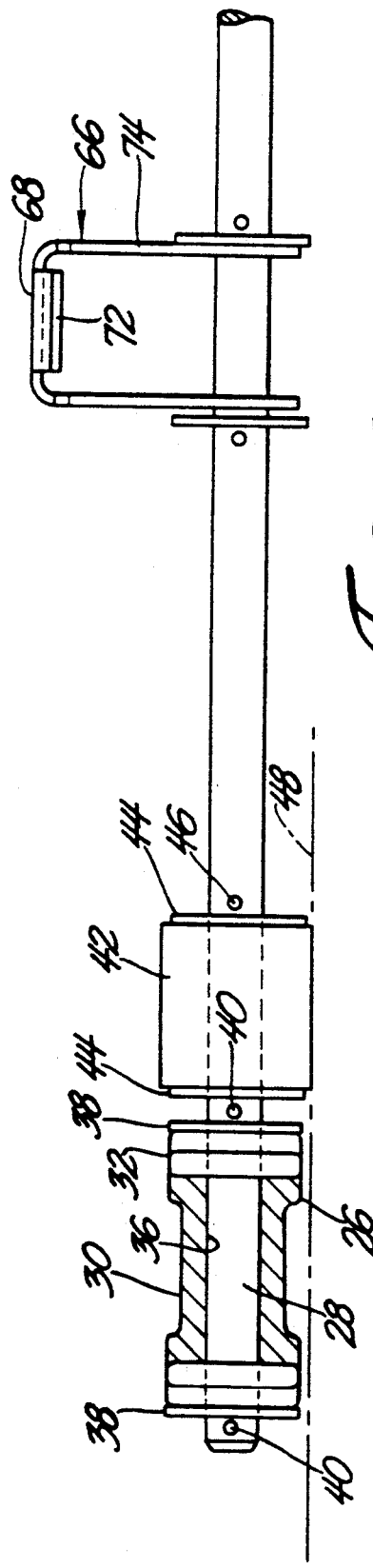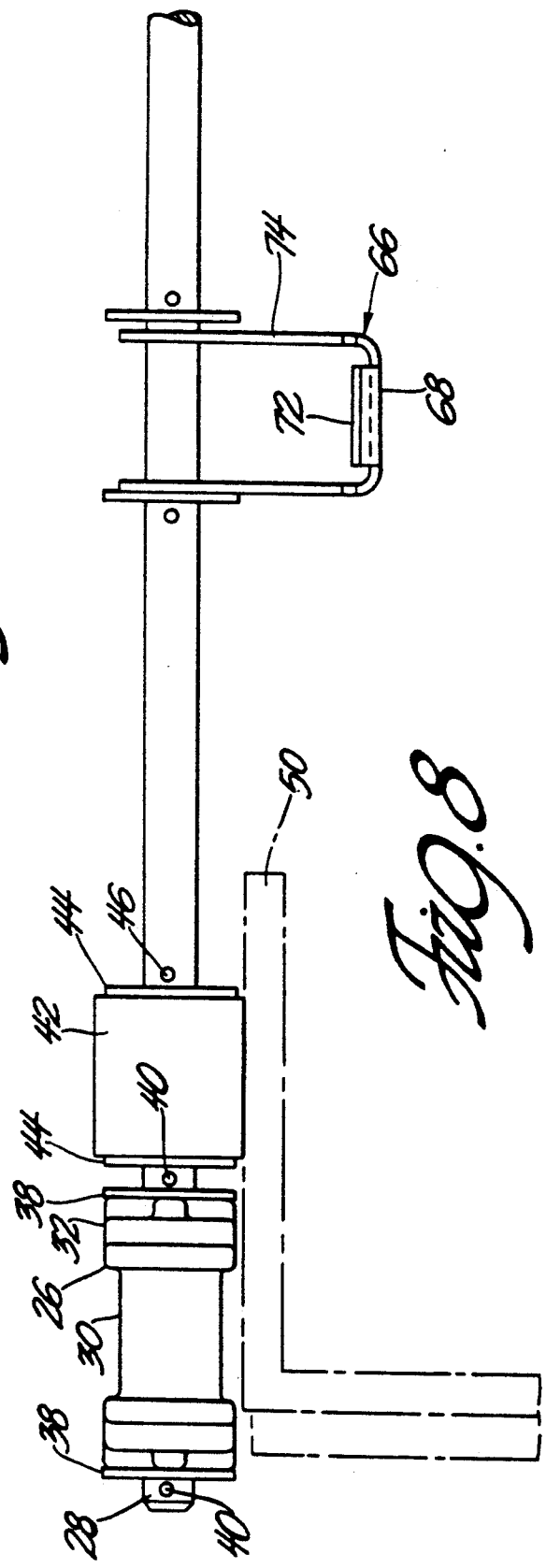

CONVEYOR BELT FOR BRAZE FURNACE

TECHNICAL FIELD

The subject invention relates to a conveyor assembly for conveying workparts through a braze furnace, and more particularly to a conveyor assembly having parallel rows of conveyor chain interconnected by cross members with rollers disposed on the cross members and workpart support members extending upwardly from the cross members.

BACKGROUND OF THE INVENTION

Heat exchangers are used in various capacities in automotive applications, e.g., radiators, heater cores, air conditioning evaporators, and condensers. Although heat exchangers vary in shape and form from one to another, generally speaking, they are made from aluminum and consist of two spaced header tanks interconnected by flow tubes having interspersed cooling fins. Fluid is circulated through the header tanks and flow tubes to effect the necessary temperature drop.

The header tanks, flow tubes, and cooling fins are rigidly attached to one another by brazing. It has been found that this brazing operation can be most efficiently accomplished in a furnace for mass production applications. The prior art teaches placing the heat exchanger workparts on a continuous belt-type flexible conveyor assembly for conveying the workparts through a brazing chamber and furnace. Because the conveyor assembly also passes through the highly elevated temperatures in the braze furnace, it also is subjected to the corrosive effects of the braze fluxes which are liquified during the early stages of the braze process.

The prior art teaches constructing the conveyor assembly from a simple, flat stainless steel mesh supported directly on top of the headers or floor in the braze furnace Although inexpensive, this process is pegged with several quality disadvantages. To overcome such disadvantages, the prior art has also taught to support the workparts on support members integral with the conveyor assembly. It is critical that these workpart support members provide a smooth and flat surface to insure that the workpart is continuously and steadily supported at all times prior to the solidification of braze alloy. If the workpart is disturbed prior to braze alloy solidification, such as what occurs when the workpart support members are unstable, uneven or jostled, then splits or cracks in the braze alloy occur resulting in faulty and unacceptable workparts.

Given this, five critical factors can be identified against which a conveyor assembly is to be evaluated. First, the conveyor assembly material must exhibit acceptable durability against corrosion in the harsh brazing environment. Second, the conveyor material in contact with the workpart must not bond to the workparts during braze solidification. Third, the conveyor assembly must provide a flat, stable surface for the workparts to ride on as the braze alloy solidifies. Fourth, the conveyor assembly must have overall good mechanical durability. And fifth, the mass of the conveyor assembly must be reduced to a minimum so that heat loading of the braze furnace will not occur.

SUMMARY OF THE INVENTION AND ADVANTAGES

The subject invention contemplates a conveyor assembly for conveying workparts through a braze furnace which meets all five critical factors identified above. The assembly comprises a plurality of first chain links pivotally interconnected in sequential fashion at adjoining first pintles, a plurality of second chain links pivotally interconnected in sequential fashion at adjoining second pintles, a cross member coaxially connecting each of the first pintles with a corresponding one of the second pintles such that the first and second chain links are spaced from one another and moved in aligned fashion within the braze furnace. A roller is rotatably disposed on each of the cross members for rollably supporting the conveyor assembly within the braze furnace. And finally, a workpart support member pivotally connects adjacent pairs of the cross members and is spaced between the first and second chain links for supporting the workparts above the first and second chain links and the roller while being conveyed through the braze furnace.

The conveyor assembly of the subject invention overcomes the disadvantages of the prior art and meets the critical factors necessary in designing an acceptable conveyor assembly by the combination of features set forth above. The first and second chain links provide the necessary structural integrity to interact with the drive mechanism and bear the tensile loading without causing twisting or bending of the conveyor assembly. The cross members act both as pintles for the first and second chain links and also serve to interconnect the plurality of first chain links with the plurality of second chain links. The roller allows the conveyor assembly to move smoothly through the braze furnace by reducing drag and thereby improves the stability of the workpart support member which interconnects adjacent pairs of the cross members. This combination of features yields improved braze results by the stability imparted to the workparts during braze alloy solidification. And, because of its light weight, the conveyor assembly reduces the energy usage of the braze furnace, increases the throughput capacity of workparts, and requires minimal maintenance.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a front view of the conveyor assembly moving through the braze chamber of the braze furnace;

FIG. 4 is a front view of the conveyor assembly moving through the return passage of the braze furnace;

FIG. 5 is a fragmentary side view of the conveyor assembly and a drive sprocket;

FIG. 7 is a fragmentary front view of the conveyor assembly moving through the braze chamber of the braze furnace and showing the alternative workpart support members;

FIG. 8 is a fragmentary front view of the conveyor assembly moving through the return passage of the braze furnace and showing the alternative workpart support members.

DETAILED DESCRIPTION OF THE PREFERRED EMBODIMENT OF FIGS. 1-5

Referring to FIGS. 1-5, wherein like numerals indicate like or corresponding parts throughout the several views, a conveyor assembly according to the subject invention is generally shown at 10. The conveyor assembly 10 is of the type for conveying workparts 12 through a braze furnace apparatus, generally indicated at 14 in FIG. 1. The braze furnace 14 is shown in highly simplified form in FIG. 1 and includes a housing 16 defining an enclosed brazing atmosphere. In the well known fashion, the brazing atmosphere within the housing 16 is divided into a plurality of braze chambers or zones, successively ranged along the braze furnace 14 to provide an initial increase in temperature wherein the flux coating on the workparts is melted and then additional temperature increases so that the braze alloy is liquified. Then, one or more cooling chambers are provided to resolidify the braze alloy before the workparts 12 exit the braze furnace 14.

Figure 1:
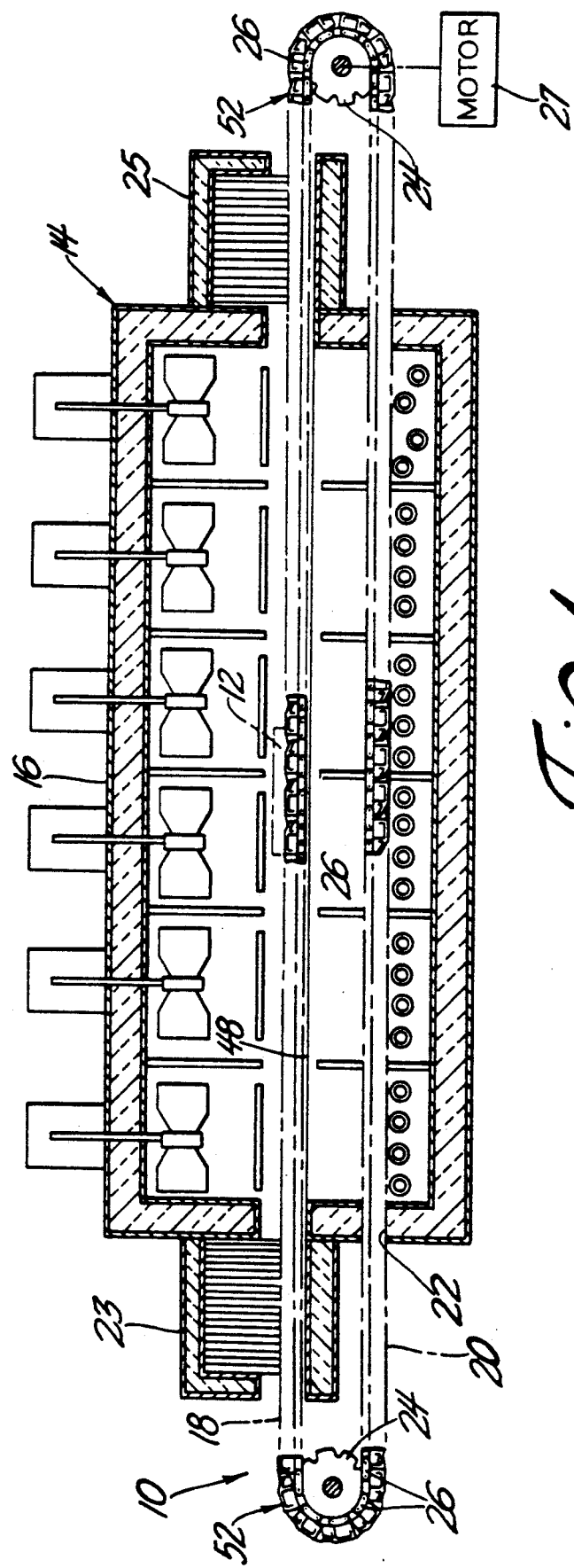
FIG. 1 is a simplified side view of the subject conveyor assembly disposed for operation in a braze furnace.

The workparts 12 rest on top of the conveyor assembly 10, under the influence of gravity, as they are transported through the braze furnace 14. The conveyor assembly 10 is of a continuous belt-type construction having an upper conveying section 18 which is moved through the braze chambers of the housing 16 and a lower return section 20 typically moved through a return passage 22 of the braze furnace 14 or alternatively routed exterior of the housing 16. The ends of the conveyor assembly 10 extending outwardly from the braze furnace 14 are typically housed within entrance and exit vestibules 23, 25, respectively, as shown in FIG. 1. The upper conveying section 18 and lower return section 20 are separated from each other at opposite ends of the conveyor assembly 10 by sprockets 24 which engage and mesh with the conveyor assembly 10. Preferably, the sprocket 24 disposed at the exit end of the braze furnace 14 is coupled to a motor 27 for driving the conveyor assembly 10 through the braze furnace 14 and thereby maintaining tension along the upper conveying section 18.

Figure 2:
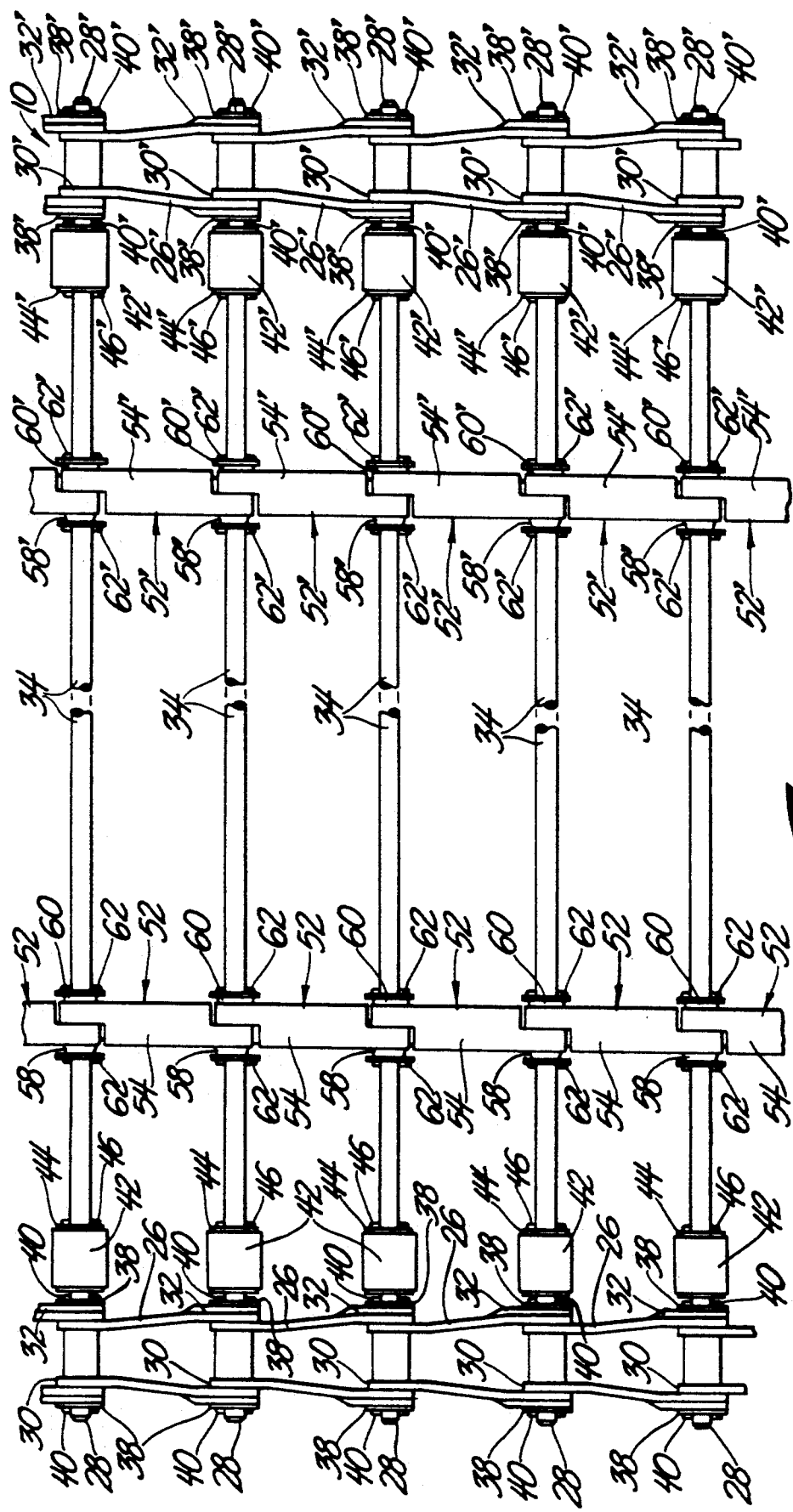
FIG. 2 is a fragmentary top view of the subject conveyor assembly.

Referring now to FIG. 2, a portion of the conveyor assembly 10 is shown in greater detail including a plurality of first chain links 26 pivotally interconnected in sequential fashion at adjoining articulated first pintles 28. More particularly, the first chain links 26 are structured according to the traditional "pintlestyle" having a male end 30 with an outer dimension and a female end 32 with an inner dimension slightly larger than the outer dimension of the male end 30 for registering in mating fashion with the male end 30 of the next adjacent first chain link 26. Thus, the sequentially arranged first chain links 26 nest, or mate, with each other to form a continuous chain link assembly.

In an identical fashion, the conveyor assembly 10 also includes a plurality of second chain links 26' pivotally interconnected in sequential fashion at adjoining second pintles 28'. The second chain links 26' each include a male end 30' with an outer dimension and a female end 32' with an inner dimension slightly larger than the outer dimension of the male end 30' for registering in mating fashion with the male end 30' of the next adjacent second chain link 26'.

The distance between adjacent pintles 28, 28' of the respective first and second chain links 26', 26' constitutes the effective pitch length, which is identical for both of the first chain links 26 and the second chain links 26', and in the preferred embodiment equals four inches. Also, to protect the first and second chain links 26, 26' from the corrosive effects of the high temperature and caustic flux material, the first and second chain links 26, 26' are preferably fabricated from a stainless steel material, such as 316L, or other suitable corrosion resistant material.

In FIGS. 2-4, the conveyor assembly 10 is shown including a cross member 34 coaxially connecting each of the first pintles 28 with a corresponding one of the second pintles 28' such that the first and second chain links 26, 26' are spaced parallel from one another and moved in aligned fashion within the braze furnace 14.

The cross member 34 is a solid cylindrical rod-like member having tapered ends extended through aligned holes in the female ends 32, 32' of each of the chain links 26, 26' and registering within a bore 36, 36' of each of the male ends 30, 30' of the respective chain links 26, 26'. Preferably, the cross members 34 are fabricated from a stainless steel material, such as 316L. Annular washers 38, 38' are disposed on opposite sides of each of the first and second chain links 26, 26'. Retainer pins 40, 40' extend through corresponding holes in each of the cross members 34 on opposite sides of the respective first and second chain links 26, 26' to prevent the cross members 34 from sliding out of the respective chain links 26, 26'. Preferably, the washers 38, 38' and retainer pins 40, 40' are also fabricated from 316L stainless steel, or other suitable corrosion resistant material.

A first cylindrical roller 42 is rollably supported on the cross member 34 between the first 26 and second 26' chain links yet proximate the first chain link 26. The first roller 42 includes a central bore (not shown) which is slightly larger than the outer diameter of the cross member 34 so that the first roller 42 freely rolls or rotates around the cross member 34. The diameter of the first roller 42 is sufficiently great enough to support the chain links 26, 26' and the workpart support members 52, 52' (described below) above the floor 48 of the braze chamber. Preferably, the first roller 42 is fabricated entirely from 316L stainless steel (or other suitable corrosion resistant material) and includes a pair of stainless steel washers 44 on opposite sides thereof. A small diametrical hole in the cross member 34 receives a retainer pin 46 for capturing the first roller 42 and the accompanying washers 44 on the cross member 34 between the one retainer pin 40 and the other retainer pin 46.

Likewise, a second roller 42' is disposed between the first and second chain links 26, 26' yet proximate the second chain link 26' and rollably supported on the cross member 34. A pair of washers 44' are disposed on opposite sides of the second roller 42' with a retainer pin 46' received in a diametrical bore in the cross member 34 to retain the second roller 42' in place on the cross member 34. The first 42 and second 42' rollers are effective to rollably support the entire conveyor assembly 10 within the braze furnace 14. As shown in FIG. 3, a floor portion 48 of the braze furnace 14 provides a flat rolling surface for the upper conveying section 18 of the conveyor assembly 10, while a pair of L-shaped brackets 50, 50' provide a flat rolling surface for the rollers 42, 42' in the lower return section 20.

A first workpart support member, generally indicated at 52, is disposed between the first and second rollers 42, 42' yet proximate the first roller 42 and pivotally connects adjacent pairs of the cross members 34 for supporting the workparts 12 above the first and second chain links 26, 26' and the first and second rollers 42, 42' while being conveyed through the braze furnace 14. The workpart support member 52 includes a flat platform 54 supported above the cross member 34 by a stanchion 56. The forward and rearward ends of the platform 54 are angled downwardly at or shallow angle to prevent any portion of the platform 54 from rising above the horizontal plane defined by all of the platforms 54 in the upper conveying section 18. The stanchion 56 and platform 54 form a generally T-shaped structure in end view as shown in FIGS. 3 and 4.

A forward bearing block 58 extends laterally from the forward end of the stanchion 56 for surrounding and pivotally connecting the cross member 34. Similarly, a rearward bearing block 60 extends from the stanchion 56, in the opposite lateral direction from the forward bearing block 58, and pivotally connects the next adjacent rearward cross member 34. One stainless steel annular washer is disposed on the outside edge of each of the forward and rearward bearing blocks 58, 60 to provide a barrier between retainer pins 62 extending through diametrical bores in the cross members 34. The passage for the cross member 34 provided in the rearward bearing block 60 is somewhat elongated, as shown in FIG. 5, to ensure that all tensile stresses occurring in the conveyor assembly 10 are borne by the first and second chain links 26, 26'.

As shown in FIG. 5, a plurality of circular voids 64 may be formed in the stanchion 56 for the purpose of reducing weight without appreciably diminishing the structural integrity of the workpart support member 52. The workpart support member 52, as with the remainder of the conveyor assembly 10, is preferably fabricated from 316L stainless steel or other suitable corrosion resistant material.

The conveyor assembly 10 also includes a second workpart support member 52' disposed between the first and second rollers 42, 42' yet proximate the second roller 42' and pivotally connecting adjacent pairs of the cross members 34 for supporting workparts 12 above the first and second chain links 26, 26' and the first and second rollers 42, 42' while being conveyed through the braze furnace 14. The second workpart support member 52' is identical in construction to the first workpart support member 52 and includes the platform 54', stanchion 56', forward bearing block 58', rearward bearing block 60', retainer pins 62', and voids 64', as described above in connection with the first workpart support member 52.

A typical workpart 12 is illustrated in phantom in FIG. 3 supported above and upon the respective platforms 54, 54' of the first 52 and second 52' workpart support members. As will become apparent by reference to FIG. 2, the platforms 54, 54' in each of the first and second workpart support members 52, 52' include a notched area corresponding to the respective forward 58 and rearward 60 bearing blocks so that the workpart support members 52, can be arranged in simple lapping fashion along the conveyor assembly 10. In other words, each of the first workpart support members 52 include a half-lapped forward end and a reverse half-lapped rearward end for registering in aligned fashion with adjacent first workpart support members 52. Similarly, each of the second workpart support members 52' include a half-lapped forward end and a reverse half-lapped rearward end for registering in aligned fashion with adjacent second workpart support members 52'.

FIG. 5 illustrates the orientation of the first workpart support members 52 as they move to or from the upper conveying section 18 as induced by movement of the first and second chain links 26, 26' along the sprocket 24. Thus, it will be appreciated that while the sprocket 24 does not contact the conveyor assembly 10 in the vicinity of the first workpart support members 52 (nor the second workpart support members 52'), the superimposition of the sprocket 24 in FIG. 5 facilitates an understanding of the motion of the first workpart support members 52 as the conveyor assembly 10 moves around the sprockets 24.

ALTERNATIVE EMBODIMENT OF FIGS. 6–9

Referring now to FIGS. 6–9, the conveyor assembly 10 is shown in modified form including a first workpart support member 66 fabricated from flat 316L stainless steel metal (or other corrosion resistant material) in a typical stamping operation. The remainder of the conveyor assembly 10 is identical to that shown and described in connection with FIGS. 1–5, and for convenience, the reference numerals corresponding to like elements remain the same. It will also be appreciated that only a portion of the conveyor assembly 10 is shown in FIGS. 6–9. Particularly, only a first set of chain links 26, first rollers 42, first workpart support members 66 and half of the cross members 34 are shown, however the conveyor assembly 10 also includes second workpart support members, second rollers, and second chain links which are identical in construction to their counterparts described below.

Figure 9:
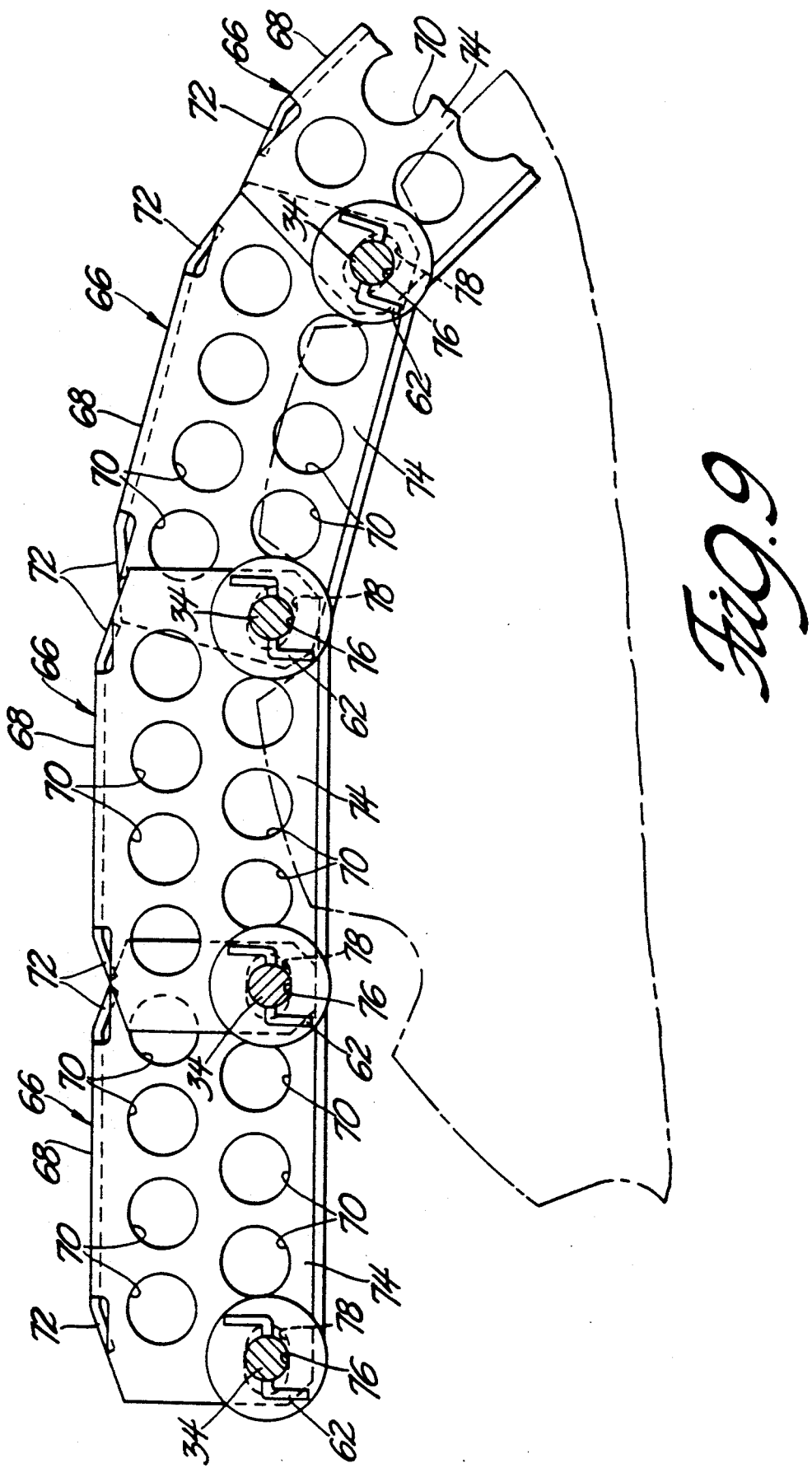
FIG. 9 is a fragmentary side view of the conveyor assembly and drive sprocket showing the alternative work support members.

The first workpart support member 66 includes a platform 68 upon which workparts 12 are supported. A pair of voids 70 may be formed in the platform 68 for reducing the weight of the element without significantly compromising its structural integrity. The forward and rearward ends of the platform 68 comprise tab-like structures 72 bent downwardly from the horizontal platform 68 at a slight angle. As shown in FIG. 9, the downward bending of the tabs 72 prevent any portion of the platform 68 from rising above the horizontal plane defined by the platforms 68 of all of the first workpart support members 66 as the workpart support members 66 move to and from the upper conveying section 18. A pair of stanchions 74 extend downwardly from opposite lateral sides of the platform 68 and extend between the adjacent cross members 34. The stanchions 34 are provided with aligned forward 76 and aligned rearward 78 cross member receiving holes performing the same function as the forward 58 and rearward 60 bearing blocks described above in connection with FIGS. 2-5. The rearward cross member receiving holes 78 are somewhat elongated, i.e., larger than the cross member 34, to ensure that all tensile loading is born solely by the first and second chain links 26, 26'. That is, the elongated opening in the rearward cross member receiving holes 78 isolates the first and second workpart support members 66 from all tensile forces.

Figure 6:
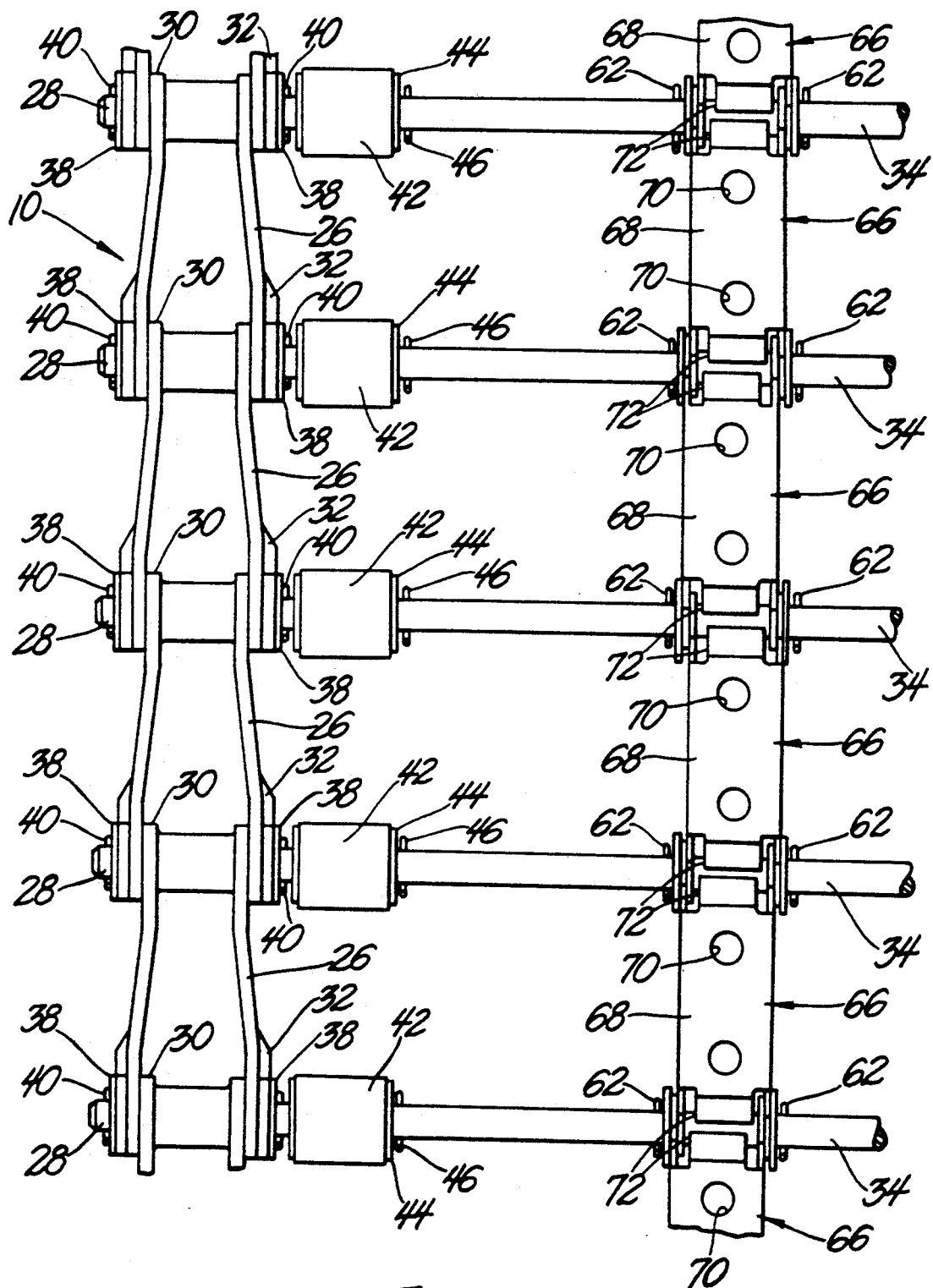
FIG. 6 is a fragmentary top view of the conveyor assembly showing alternative workpart support members.

Because the first workpart support members 66 are fabricated from stamped sheet metal as described above, its forward and rearward are juxtaposed in laterally offset fashion with adjacent workpart support members 66, as best shown in FIG. 6. Likewise, the second workpart support members (not shown) are fabricated identically to that described above and have forward and rearward ends juxtaposed in laterally offset fashion with the next adjacent second workpart support members. Large circular voids 70 are also formed in the stanchions 74 to reduce weight.

The conveyor assembly 10 yields improved braze results by steadily supporting workparts during braze alloy solidification And because of its light weight, the conveyor assembly 10 reduces the energy usage of the braze furnace 14, increases the throughput capacity of workparts 12, and requires minimal maintenance and upkeep.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A conveyor assembly for conveying workparts through a braze furnace, said assembly comprising: a plurality of first chain links pivotally interconnected in sequential fashion at adjoining first pintles; a plurality of second chain links pivotally interconnected in sequential fashion at adjoining pintle; a cross member coaxially connecting each of said first pintles with a corresponding one of said second pintles such that said first and second chain links are spaced parallel to one another and moved in aligned fashion through the braze furnace; a roller rotatably disposed on each of said cross members for rotatably supporting said conveyor assembly within the braze furnace; and a workpart support member pivotally connecting adjacent pairs of said cross members and spaced between said first and second chain links for supporting workparts above said first and second chain links and said roller while being conveyed through the braze furnace.

2. A conveyor assembly for conveying workparts through a braze furnace, said assembly comprising: a plurality of first chain links pivotally interconnected insequential fashion at adjoining first pintles; a plurality of second chain links pivotally interconnected in sequential fashion at adjoining second pintles; a cross member coaxially connecting each of said first pintles with a corresponding one of said second pintles such that said first and second chain links are spaced parallel from one another and moved in aligned fashion through the braze furnace; a first roller disposed between said first and second chain links proximate said first chain link and rollably supported on said cross member; a second roller disposed between said first and second chain links proximate said second chain link and rollably supported on said cross member; a first workpart support member disposed between said first and second rollers proximate said first roller and pivotally connecting adjacent pairs of said cross members for supporting workparts above said first and second chain links and said first and second rollers while conveyed through the braze furnace; and a second workpart support member disposed between said first and second rollers proximate said second roller and pivotally connecting adjacent pairs of said cross members for supporting workparts above said first and second chain links and said first and second rollers while being conveyed through the braze furnace.

3. A conveyor assembly for conveying workparts through a braze furnace, said assembly comprising: a plurality of first chain links pivotally interconnected in sequential fashion at adjoining first pintles; each of said first chain links having a male end with an outer dimension and a female end with an inner dimension slightly larger than said outer dimension of said male end for registering in mating fashion with said male end of the next adjacent said first chain link; a plurality of said second chain links pivotally interconnected in sequential fashion at adjoining second pintles; each of said second chain links having a male end with an outer dimension and a female with an inner dimension slightly larger than said outer dimension of said male end for registering in mating fashion with said male end of the next adjacent said second chain link; a cross member coaxially connecting each of said first pintles with a corresponding one of said second pintles such that said first and second chain links are spaced parallel from one another and moved in aligned fashion through the braze furnace; a first roller disposed between said first and second chain links proximate said first chain link and rollably supported on said cross member; a second roller disposed between said first and second chain links proximate said second chain link and rollably supported on said cross member; a first workpart support member disposed between said first and second rollers proximate said first roller and pivotally connecting adjacent pairs of said cross members for supporting workparts above said first and second chain links and said first and second rollers while being conveyed through the braze furnace; and a second workpart support member disposed between said first and second rollers proximate said second roller and pivotally connecting adjacent pairs of said cross members for supporting workparts above said first and second chain links and said first and second rollers while being conveyed through the braze furnace.

4. A conveyor assembly for conveying workparts through a braze furnace, said assembly comprising: a plurality of first chain links pivotally interconnected in sequential fashion at adjoining first pintles, each of said first chain links being fabricated from a stainless steel material; a plurality of second chain links pivotally interconnected in sequential fashion at adjoining second pintles, each of said second chain links being fabricated from a stainless steel material; a cross member coaxially connecting each of said first pintles with a corresponding one of said second pintles such that said first and second chain links are spaced parallel from one another and moved in aligned fashion through the braze furnace, said cross member being fabricated from stainless steel material; a first roller disposed between said first and second chain links proximate said first chain link and rollably supported on said cross member, said first roller being fabricated from a stainless steel material; a second roller disposed between said first and second chain links proximate said second chain link and rollably supported on said cross member, said second roller being fabricated from a stainless disposed between said first and second roller proximate said first roller and pivotally connecting adjacent pairs of said cross members, said first workpart support member being fabricated from a stainless steel material; and a second workpart support member disposed between said first and second rollers proximate said second roller and pivotally connecting adjacent pairs of said cross members, said second workpart support member being fabricated from a stainless steel material.

5. A conveyor assembly for conveying workparts through a braze furnace, said assembly comprising: a plurality of first chain links pivotally interconnected in sequential fashion at adjoining first pintles; a plurality of second chain links pivotally interconnected in sequential fashion at adjoining second pintles; a cross member coaxially connecting each of said first pintles with a corresponding one of said second pintles such that said first and second chain links are spaced parallel from one another and moved in aligned fashion through the braze furnace; a first roller disposed between said first and second chain links proximate said first chain link and rollably supported on said cross member; a second roller disposed between said first and second chain links proximate said second chain link and rollably supported on said cross member; a first workpart support member disposed between said first and second rollers proximate said first roller and pivotally connecting adjacent pairs of said cross members, said first workpart support member having a half-lapped forward end and a reverse half-lapped rearward end for registering in aligned fashion with an adjacent one of said first workpart support members; and a second workpart support member disposed between said first and second rollers proximate said second roller and pivotally connecting adjacent pairs of said cross members, said second workpart support member having a half-lapped forward end and a reverse half-lapped rearward end for registering in aligned fashion with an adjacent one of said second workpart support members.

6. A conveyor assembly for conveying workparts through a braze furnace, said assembly comprising: a plurality of first chain links pivotally interconnected in sequential fashion at adjoining first pintles; a plurality of second chain links pivotally interconnected in sequential fashion at adjoining second pintles; a cross member coaxially connecting each of said first pintles with a corresponding one of said second pintles such that said first and second chain links are spaced parallel from one another and moved in aligned fashion through the braze furnace; a first roller disposed between said first and second chain links proximate said first chain link and rollably supported on said cross member; a second roller disposed between said first and second chain links proximate said second chain link and rollably supported on said cross member; a first workpart support member disposed between said first and second rollers proximate said first roller and pivotally connecting adjacent pairs of said cross members said first workpart support member being fabricated from stamped sheet metal and having a forward end and a rearward end juxtaposed in laterally offset fashion with an adjacent one of said first workpart support members; and a second workpart support member disposed between said first and second rollers proximate said second roller and pivotally connecting adjacent pairs of said cross members, said second workpart support member being fabricated from stamped sheet metal and having a forward end and a rearward end juxtaposed in laterally offset fashion with an adjacent one of said first workpart support members.

* * * * *